(12) United States Patent
Allen et al.

(10) Patent No.: US 7,490,098 B2
(45) Date of Patent: Feb. 10, 2009

(54) APPARATUS, SYSTEM, AND METHOD FOR PROCESSING HIERARCHICAL DATA IN DISPARATE DATA REPOSITORIES

(75) Inventors: Corville O. Allen, Murrisville, NC (US); Travis Eli Nelson, Campbell, CA (US); Ranjana Kaur Tasser, Fremont, CA (US); Suraksha Vidyarthi, Newark, CA (US)

(73) Assignee: International Business Machines Corporation, Armonk, NY (US)

( * ) Notice: Subject to any disclaimer, the term of this patent is extended or adjusted under 35 U.S.C. 154(b) by 412 days.

(21) Appl. No.: 11/150,642

(22) Filed: Jun. 10, 2005

(65) Prior Publication Data
US 2006/0282439 A1    Dec. 14, 2006

(51) Int. Cl.
G06F 17/30    (2006.01)
(52) U.S. Cl. .................... 707/101; 707/102; 707/104.1; 703/1
(58) Field of Classification Search ................ 707/101, 707/102, 104.1; 703/1
See application file for complete search history.

(56) References Cited

U.S. PATENT DOCUMENTS

| | | | |
|---|---|---|---|
| 6,499,036 B1 | 12/2002 | Gurevich .................... 707/103 |
| 6,651,243 B1 * | 11/2003 | Berry et al. ................. 717/130 |
| 6,654,753 B1 * | 11/2003 | Arda et al. ................... 707/100 |
| 6,665,662 B1 * | 12/2003 | Kirkwood et al. ............... 707/3 |
| 6,711,624 B1 | 3/2004 | Narurkar et al. ............ 709/321 |
| 6,867,782 B2 * | 3/2005 | Gaudette et al. ............ 345/530 |
| 6,924,821 B2 * | 8/2005 | Trinh et al. .................. 345/629 |
| 7,155,440 B1 * | 12/2006 | Kronmiller et al. ......... 707/100 |
| 7,197,512 B2 | 3/2007 | Pharies et al. ............... 707/103 |
| 2002/0147731 A1 * | 10/2002 | Seestrom et al. ......... 707/104.1 |
| 2003/0101169 A1 * | 5/2003 | Bhatt et al. ..................... 707/3 |
| 2003/0101194 A1 * | 5/2003 | Rys et al. ..................... 707/101 |
| 2003/0195765 A1 | 10/2003 | Sehga et al. ................... 705/1 |
| 2004/0117513 A1 | 6/2004 | Scott ............................. 710/1 |
| 2005/0080755 A1 | 4/2005 | Aoyama ........................ 707/1 |

(Continued)

FOREIGN PATENT DOCUMENTS

EP    1117049    7/2001

(Continued)

OTHER PUBLICATIONS

ICS Technical Support Services "Stored Procedures", ICS Support Oct. 2001, http://web.archive.org/web/20011005162453/http://www.ics.com/support/docs/dx/1.5/stored.html, ICS Support, Oct. 2001.*

(Continued)

*Primary Examiner*—Shahid Al alam
*Assistant Examiner*—Phong Nguyen
(74) *Attorney, Agent, or Firm*—Kunzler & McKenzie (57) ABSTRACT

A method is disclosed for receiving a hierarchical data structure, analyzing the hierarchical data structure to determine what actions are needed to correctly process the hierarchical data structure in a data repository, generating a hierarchical command structure comprising a series of repository-specific commands needed to interface with the data repository, and executing the repository-specific commands to process the hierarchical data structure with respect to the data repository. In selected embodiments, the hierarchical command structure is represented as a series of nodes including a parent node and at least one child node.

9 Claims, 11 Drawing Sheets

U.S. PATENT DOCUMENTS

| | | | |
|---|---|---|---|
| 2005/0171966 A1* | 8/2005 | Rath et al. | 707/101 |
| 2005/0246435 A1 | 11/2005 | Choudhary et al. | 709/223 |
| 2006/0095288 A1 | 5/2006 | Amys et al. | 705/1 |
| 2006/0259909 A1 | 11/2006 | Passero et al. | 719/312 |
| 2006/0282439 A1 | 12/2006 | Allen et al. | 707/100 |
| 2007/0016915 A1 | 1/2007 | Mukundan et al. | 719/330 |

FOREIGN PATENT DOCUMENTS

| | | |
|---|---|---|
| WO | WO9915979 | 4/1999 |

OTHER PUBLICATIONS

ICS Technical Support Services, "Stored Procedures", ICS Support Oct. 2001, http://web.archive.org/web/20011005162453/http://www.ics.com/support/docs/dx/1.5/stored.html, ICS Support, Oct. 5, 2001. accessed Sep. 11, 2007, Sep. 14, 2007.

Welcome to the IBM WebSphere® Host Access Trandformation Services (HATS) V6 Information Center, http://publib.boulder.ibm.com/infocenter/hatshelp/v60/index.jsp?topic=/com.ibm.hats.doc/common_swg/welcome_template/websphere/WebSphereHats.htm accessed Jul. 5, 2007.

Using the HATS Bidirectional API, http://publib.boulder.ibm.com/infocenter/hatshelp/v60/topic/com.ibm.hat accessed Jul. 5, 2007.

Adapter Pattern, from Wikipedia, the free encyclopedia, http://en.wikipedia.org/wiki/Adapter_pattern accessed Nov. 28, 2007.

* cited by examiner

APPARATUS, SYSTEM, AND METHOD FOR PROCESSING HIERARCHICAL DATA IN DISPARATE DATA REPOSITORIES

BACKGROUND OF THE INVENTION

1. Field of the Invention

This invention relates to processing hierarchical data structures and more particularly to methods for processing hierarchical data structures in disparate data repositories.

2. Description of the Related Art

Current data programming technologies are usually tailored to specific types of data repositories. In real-world applications, however, data frequently originates from a variety of heterogeneous data repositories such as databases, Web services, XML data stores, enterprise information systems, and the like. This heterogeneity creates significant challenges for application developers because of the broad range of programming models needed to interface with these diverse data repositories.

Typically, when a client interacts with a data repository in a heterogeneous environment, an intermediary agent, such as an adapter or other mediator, is used to bridge the gap between the client and the data repository, each of which may use different data conventions and operations for processing data. When data is stored as hierarchical data structures, the processing of these hierarchical structures can be quite complex. The processing is usually performed with a large repository-specific adapter. This adapter may be used to walk the hierarchical data structure, calculate what tasks need to be performed, and perform the desired operations in the data repository.

Nevertheless, this approach has several drawbacks. For example, the code for each adapter or mediator typically cannot be re-used since it is tailored specifically to the interaction between a particular client and a particular data repository. Because the adapter or mediator cannot be reused, a new adapter must often be created to bridge the gap between a different client and data repository combination. Creating a new adapter is often quite complex. Because of this complexity, there is a large potential for error when creating a new adapter.

Thus, methods are needed for simplifying the processing of hierarchical data structures, while being flexible enough to work with a variety of heterogeneous data repositories. Likewise, a common model is needed to represent operations for processing these hierarchical data structures. Such a model would simplify and improve the readability of code used to process these hierarchical data structures, while reducing errors and providing improved debugging and serviceability. Likewise, such a model may provide a simpler, more unified model for application programmers and provide new opportunities for tools and frameworks to work in a consistent manner with various heterogeneous data repositories.

SUMMARY OF THE INVENTION

The present invention has been developed in response to the present state of the art and, in particular, in response to the problems and needs in the art that have not yet been fully solved by currently available apparatus, systems, and methods. Accordingly, the present invention has been developed to provide apparatus, systems, and methods for processing hierarchical data structures in disparate data repositories that overcome many or all of the above-discussed shortcomings in the art.

In one embodiment, a computer program product (comprising a computer-readable medium having computer-usable program code for processing a hierarchical data structure) includes computer-usable program code for receiving a hierarchical data structure from a client, analyzing the hierarchical data structure to determine what actions are needed to correctly process the hierarchical data structure with respect to a data repository, generating a hierarchical command structure comprising a series of repository-specific commands needed to interface with the data repository and satisfy processing requirements of the hierarchical data structure, and executing the repository-specific commands to process the hierarchical data structure with respect to the data repository.

In selected embodiments, the hierarchical command structure comprises a parent node and at least one child node. Each of these nodes may include a repository-specific command such as an update command, a create command, a delete command, a retrieve command, a no-op command, and a function call command. Likewise the data repository may be any type of data repository including a database, an enterprise information system, an XML data source, a web service, an application, a file system, or the like.

In certain embodiments, the computer program product may include computer-usable program code for establishing an execution sequence for the repository-specific commands, storing the execution sequence in the hierarchical command structure, and executing the repository-specific commands in accordance with the execution sequence. Likewise, the computer program product may include computer-usable program code for determining whether the incoming hierarchical data structure is a snapshot structure, a delta structure, one or more function calls, or the like. If the hierarchical data structure is a snapshot structure, the computer program product may compare the hierarchical data structure with an existing hierarchical data structure retrieved from the data repository. If the hierarchical data structure is a delta structure, the computer program product may examine change metadata from an annotation or header associated with the delta structure.

In another embodiment, a system for processing a hierarchical data structure includes a client configured to generate a hierarchical data structure independent of a specific type of data repository, a data repository, and a mediator configured to receive the hierarchical data structure from the client. The mediator may include a command manager module to analyze the hierarchical data structure and generate a hierarchical command structure for processing the hierarchical data structure in the data repository, a command factory module to populate the hierarchical command structure with repository-specific commands for interfacing with the data repository, and an interpreter module for processing the hierarchical command structure by executing the repository-specific commands.

In certain embodiments, the command manager module is configured to establish an execution sequence for the repository-specific commands. This execution sequence may be stored in the hierarchical command structure. The interpreter module is then used to execute the repository-specific commands in accordance with the execution sequence. The command manager may also determine whether the hierarchical data structure is one of a snapshot structure, a delta structure, or a function call. If the hierarchical data structure is a snapshot structure, the command manager module may compare the hierarchical data structure with an existing data structure retrieved from the data repository. If the hierarchical data structure is a delta structure, the command manager module may examine change metadata from an annotation or header associated with the delta structure.

In another embodiment, a method for processing hierarchical data structures for a data repository includes receiving a hierarchical data structure including a type identifier and one or more data nodes, determining a type for the hierarchical data structure based on the type identifier, generating a hierarchical command structure including one more commands associated with the one or more data nodes, determining an execution sequence for each command of the hierarchical command structure, and processing each command in the hierarchical command structure according to the execution sequence.

In certain embodiments, the type identifier a snapshot structure, a delta structure, one or more function calls, or other structure. Depending on the type identifier, the hierarchical data structure may be processed differently. For example, if the hierarchical data structure is a snapshot structure, the hierarchical data structure may be compared to an existing hierarchical data structure. If the hierarchical data structure is a delta structure, change metadata in an annotation or header associated with the delta structure may be analyzed.

The present invention provides novel apparatus, systems, and methods for processing a hierarchical data structure. The features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, refer to the same embodiment.

Furthermore, the described features, structures, or characteristics of the invention may be combined in any suitable manner in one or more embodiments. In the following description, numerous specific details are disclosed to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Many of the functional units described in this specification have been labeled as modules in order to more particularly emphasize their implementation independence. For example, a module may be implemented as a hardware circuit comprising custom VLSI circuits or gate arrays, or off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may be organized as objects, procedures, or functions. Nevertheless, the executables of an identified module need not be physically located together, but may comprise disparate instructions stored in different locations which, when joined logically together, comprise the module and achieve the stated purpose of the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The invention can take the form of an entire hardware embodiment, an entire software embodiment, or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk—read only memory (CD-ROM), compact disk—read/write (CD-R/W), and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems, remote printers, or storage devices through intervening private or public networks. Modems, cable modems, and Ethernet cards are just a few of the currently available types of network adapters.

Figure 1:
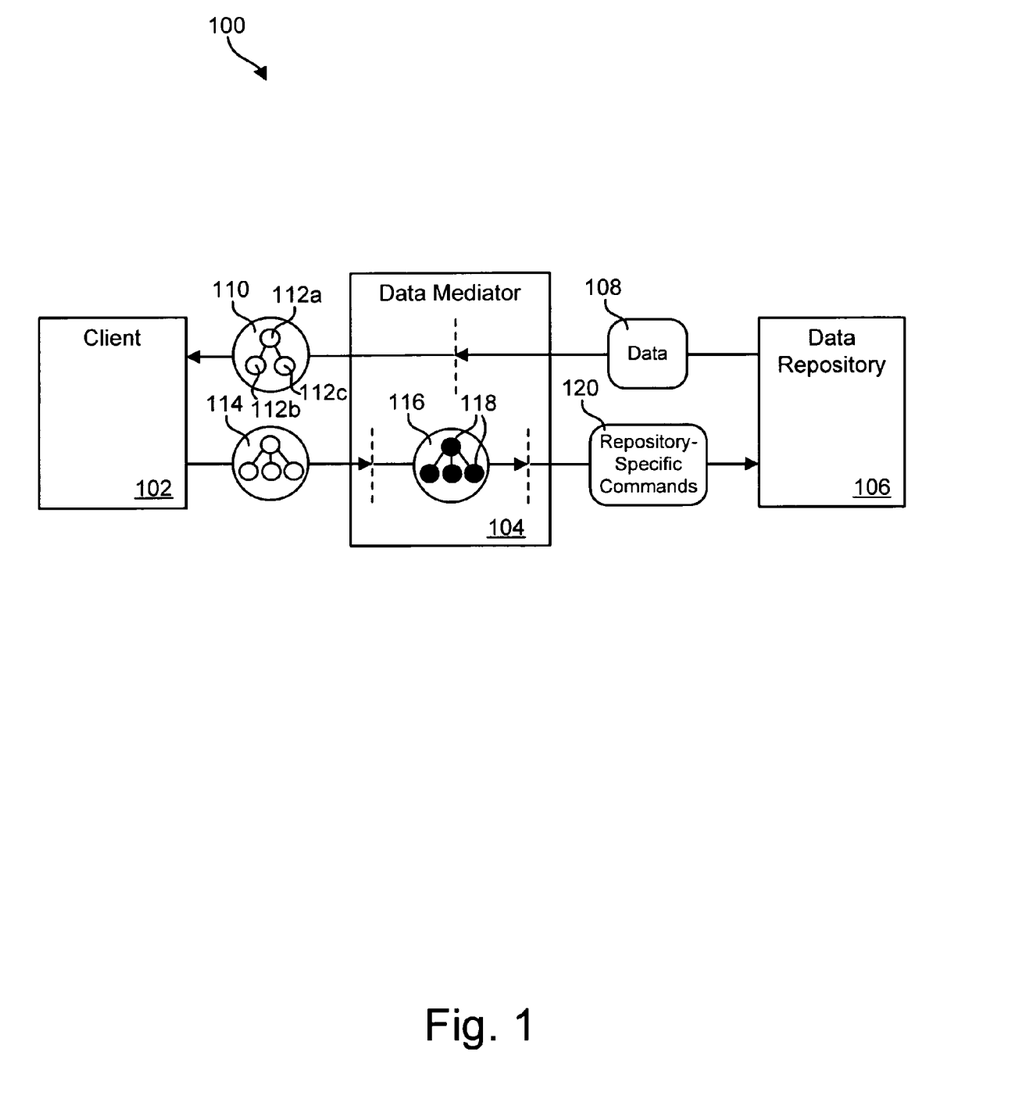
FIG. 1 is a high-level block diagram illustrating one embodiment of a system for processing a hierarchical data structure.

Referring to FIG. 1, one embodiment of a system 100 for processing hierarchical data structures may include a client 102, a data mediator 104, and a data repository 106. In response to a request from a client 102 or other event, the data mediator 104 may be configured to retrieve hierarchical data 108 from the data repository 106. The data mediator 104 may accomplish this task by communicating with the data repository 106 using the repository's application program interface (API) or other interface for communicating with external applications. The data mediator 104 may convert this hierarchical data 108 into a hierarchical data structure 110.

For example, the data mediator 104 may break the hierarchical data 108 into a series of individual data objects 112a-c represented as nodes 112a-c in the hierarchical data structure 110. The hierarchical data structure 110 may include a parent data object 112a in addition to one or more child objects 112b, 112c. Each of these objects 112a-c may contain a set of named attributes represented as primitive-type values or references to other data objects 112a-c. By breaking up the hierarchical data 108 in this manner, the data 108 may be more easily viewed, manipulated, updated, introspected, and the like.

Once created, the hierarchical data structure 110 may be transmitted to a client 102. In certain embodiments, the client 102 may operate on the hierarchical data structure 110 by altering or transforming the structure 110 to create a new hierarchical data structure 114. This new hierarchical data structure 114 may reflect desired changes or updates to the structure 110 and the data contained therein. Changes or updates may include adding child objects, deleting child objects, updating data in one or more objects, or the like. Alternatively, as opposed to reflecting changes to the hierarchical data structure 110, the data structure 114 may be a completely new structure 114. Once generated, this new hierarchical data structure 114 may be transmitted to the data mediator 104.

The data mediator 104 may analyze the new data structure 114 to determine what actions are needed to process the structure 114 in the data repository 106. Because the data mediator 104 communicates with the data repository 106 by way of a specific API or other interface, this includes determining the native commands needed to perform the desired actions in the data repository 106. Upon analyzing the data structure 114, the data mediator 104 may create a hierarchical command structure 116 comprising a series of commands 118 for processing the data structure 114 in the data repository 106. Like the data structure 114, these commands 118 may be broken up into a series of nodes 118, including a parent node 118 and one or more child nodes 118. In certain embodiments, each data node of the data structure 114 may be serviced by an individual command 118. By using this approach, the traversal of the hierarchical data structure 114 is abstracted into common code, and actions for processing the hierarchical data structure 114 are reduced to simple commands 118 or operations 118 performed on each node of the data structure 114. Furthermore, this approach simplifies the process of tailoring a data mediator 104 or other adapter to a specific data repository 106 by reducing complexity and, consequently, the possibility of error.

Once generated, the data mediator 104 may process the command structure 116 by executing each of the commands 118 in a rule-based manner. As will be discussed in more detail hereafter, this may include executing each of the commands 118 according to an established execution sequence. Likewise, processing the command structure 116 may include calling or executing repository-specific commands 120 needed to interface with the data repository 106.

Figure 2:
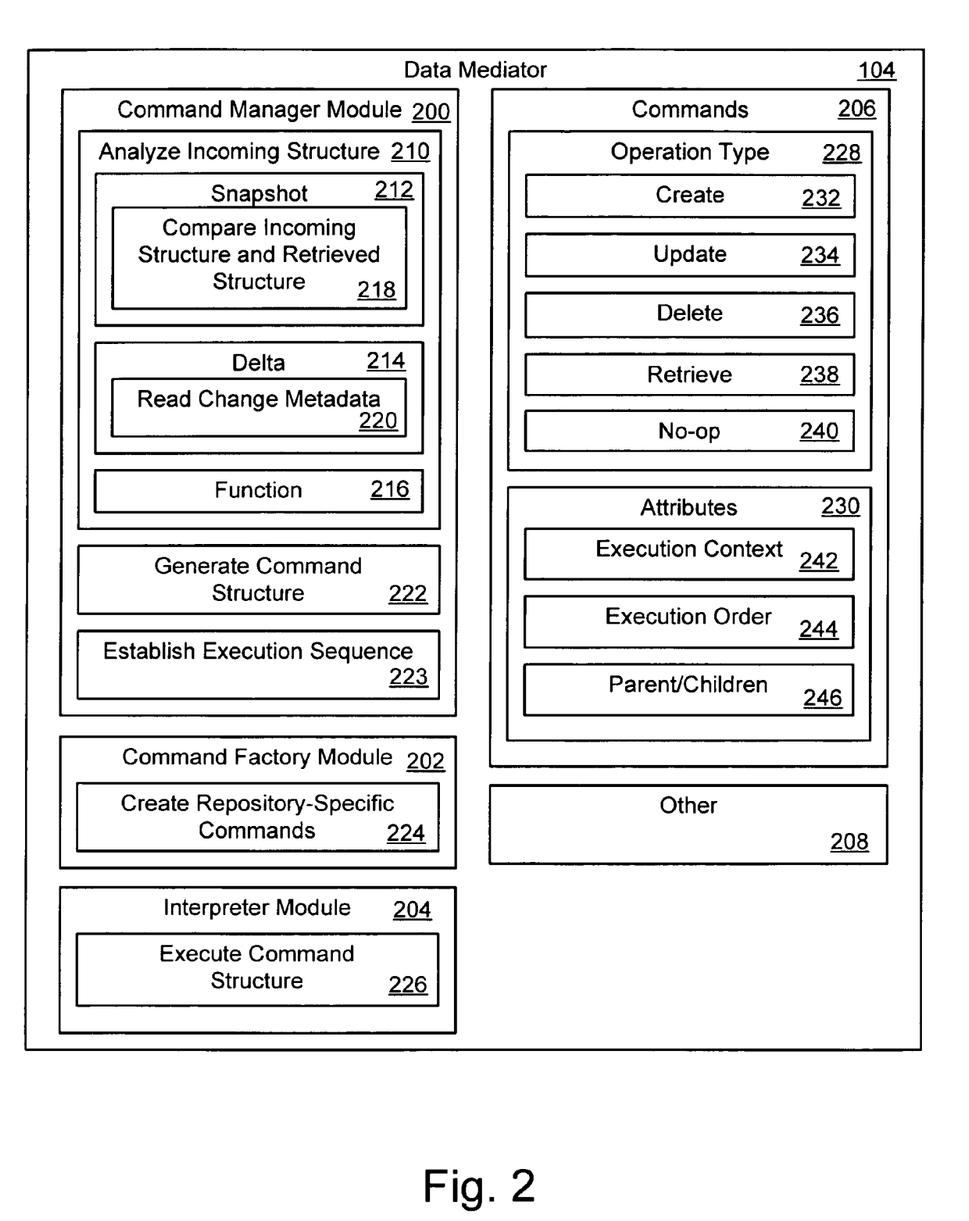
FIG. 2 is a block diagram illustrating one embodiment of a data mediator in accordance with the invention.

Referring to FIG. 2, in selected embodiments, a data mediator 104 in accordance with the invention may include a command manager module 200, a command factory module 202, an interpreter module 204, commands 206, as well as other modules 208 to provide other functionality as needed. In certain embodiments, the command manager module 200 may be configured to analyze 210 an incoming data structure 114 to determine its type and processing requirements corresponding to the type. For example, in certain embodiments, an incoming data structure 114 may be a snapshot structure 212, a delta structure 214, or simply a function call 216 for performing some action in the data repository 106. A snapshot structure 212 is a structure that reflects the way the data structure 212 should look, whereas a delta structure 214 contains information reflecting desired changes to the incoming data structure 114.

If the incoming structure 114 is a snapshot structure 212, then the command manager module 200 may compare 218 the incoming data structure 114 with the data structure as it exists in the data repository 106. This enables the command manager module 200 to determine what actions are needed to replace the existing data structure with the incoming data structure 114. If the incoming structure 114 is a delta structure 214, the command manager module 200 may read 220 change metadata associated with the incoming data structure 114. This enables the command manager module 200 to modify the existing data structure in the data repository 106 to reflect these changes. Once a course of action is determined, the command manager module 200 may generate 222 a command structure 116 to produce the desired modifications in the data repository 106.

In certain embodiments, the command manager module 200 may establish 223 an execution sequence for commands in the command structure 116 if the commands need to be processed in a certain order. The execution sequence may be important in cases where there are certain dependencies in a specific data repository 106. For example, in a Java Database Connectivity (JDBC) system, it may be necessary to create a child object before creating the parent object due to the automatic creation of keys. Thus, the execution sequence may enable certain commands to be executed before or after others.

To generate the command structure 116, the command manager module 200 may utilize a command factory module 202 to create 224 instances of commands 206. While the command manager module 200 may be universal to different types of data repositories 106, the command factory module 202 may be implemented for a specific data repository 106. That is, the command factory module 202 may generate repository-specific commands 206 to interface with a specific data repository 104 using the repository's native functions calls, methods, protocols, data conventions, and the like. Thus, a different command factory 202 may be used for each different type of data repository 106.

The data mediator 104 may also include an interpreter module 204 for executing 226 the command structure 116. When executing the command structure 116, the interpreter module 204 may traverse the command structure 116 and execute each of the commands according to the execution sequence. In certain embodiments, the interpreter module 204 is generic and may be implemented with different types of data repositories 106.

In selected embodiments, commands 206 used to populate the command structure 116 may be characterized by an operation type 228 as well as other attributes 230. Basic operations may include, for example, a create 232, update 234, delete 236, retrieve 238, or no-op operation 240. These operations may provide the basic set of actions that may be performed on a particular data entity. In particular, a create command 232 may be used to create an object structure inside the data repository 106. An update command 234 may be used to update a data structure already existing in the data repository 106. A delete command 236 may be used to delete an existing object structure in the data repository 106. A retrieve command 238 may be used to retrieve an existing object structure in the data repository 106. A no-op command 240, on the other hand, may not represent an operation on a data entity, but may act as a place-holder to preserve the relationship between parent and child commands 206. The no-op command 240 will be described in more detail in the description relating to FIG. 8. In certain embodiments, these command types (i.e., create command, update command, delete command, etc.) are simply subclasses of an abstract command type 206.

A command 206 may also include one or more attributes 230. For example, to establish an execution sequence for commands 206 in a command structure 116, each command 206 may include an attribute specifying an execution context 242 and an execution order 244. The execution context 242 may identify the execution sequence of a command 206 relative to its parent command. For example, in certain embodiments, allowable values for the execution context attribute 242 may include "Before Parent" or "After Parent," indicating when a particular command should be executed relative to its parent command. Likewise, the execution order attribute 244 may indicate the execution sequence of commands 206 having the same execution context 242. The execution context and execution order attributes 242, 244 will be discussed in additional detail in relation to FIGS. 9 through 11.

Similarly, commands 206 may include one or more attributes 246 specifying a parent or child relationship with another command 206. These attributes 246 may be used to define the structure and relationship of commands 206 in the command structure 116 and may also be used when traversing the command structure 116 during execution.

Figure 3:
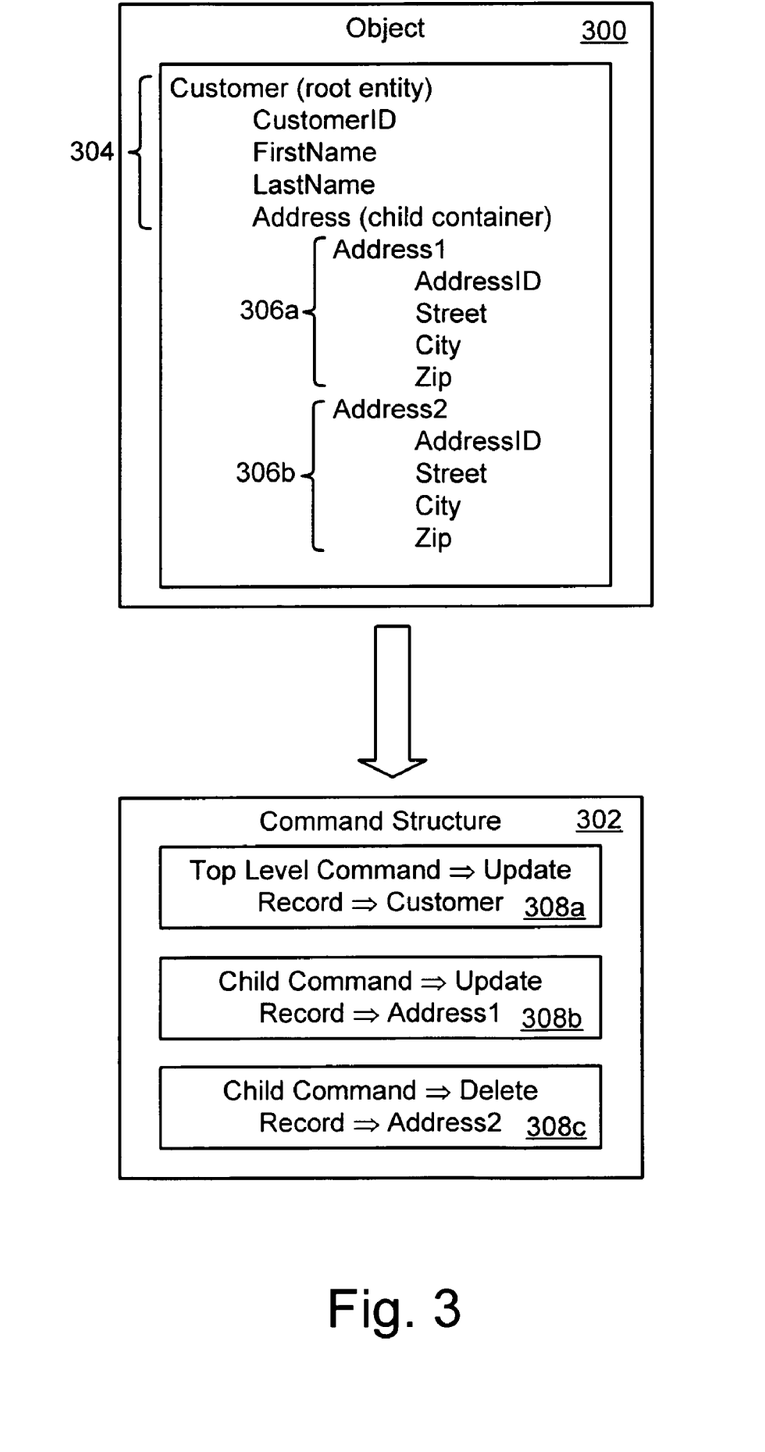
FIG. 3 is an example of one embodiment of a command structure generated for a specific hierarchical data structure.

Referring to FIG. 3, one example of an object 300, or hierarchical data structure 300, and an associated command structure 302 is illustrated. In this example, a parent object 304 named "Customer" contains two child objects 306a, 306b named "Address1" and "Address2," respectively. If a user desires to modify Address1 and delete Address2, these changes may be communicated to the data mediator 104 in the incoming data structure 114. In certain embodiments, these changes may be provided as either a snapshot structure 212 or a delta structure 214 as described in relation to FIG. 2. The data mediator 104 may then construct a command structure 302 containing repository-specific commands 308a-c for producing these changes in a specific data repository 106.

For example, the command structure 302 may include a top-level update command 308a, corresponding to the top-level object "Customer" 304, a child update command 308b, corresponding to the child object "Address1" 306a, and a child delete command 308c, corresponding to the child object "Address2" 306b. The data mediator 104 may then execute this command structure 302 by processing these repository-specific commands 308a-c in the data repository 106.

Figure 4:
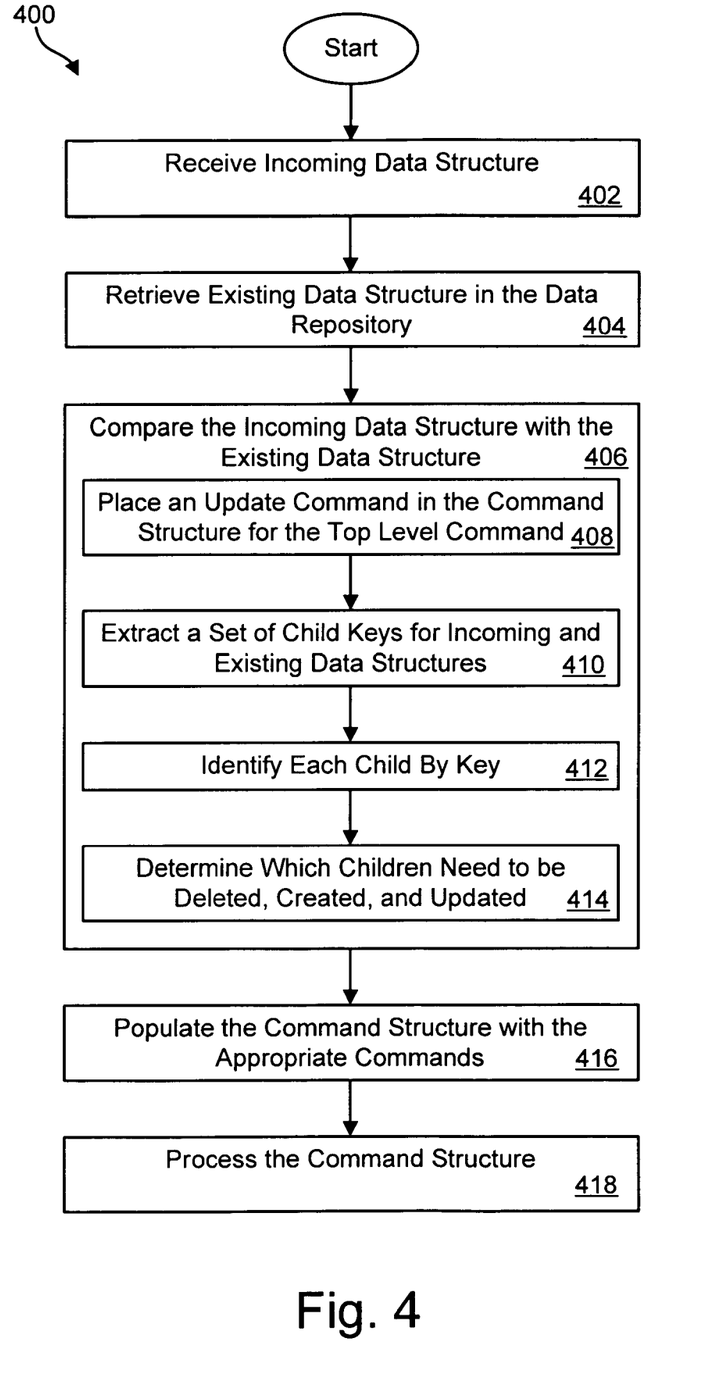
FIG. 4 is a flow chart diagram of one embodiment of a method for processing a snapshot data structure.

Referring to FIG. 4, in one embodiment, a method 400 for processing a snapshot data structure may include receiving 402 an incoming data structure 114 and retrieving 404 the corresponding data structure as it exists in the data repository 106. The D incoming data structure 114 may then be compared 406 with the existing data structure. In certain embodiments, this comparison may include placing 408 an update command in the command structure 116 for the top-level command, extracting 410 a set of child keys for the incoming and existing data structures, and identifying 412 each of the child objects in the incoming and existing data structures by key. In certain embodiments, each node of the incoming data structure 114 may contain metadata identifying the key fields. These key fields may be used to identify one child object from another.

Once the child objects are uniquely identified by their key fields, the method 400 may then determine 414 which children should be deleted, created, updated, and the like. For example, child objects that are in the existing data structure but not in the incoming data structure 114 may be deleted. Child objects in the incoming data structure 114 but not in the existing data structure may be created. Child objects that are in both the incoming and existing data structure may be updated.

Based on these determinations, the method 400 may then populate 416 the command structure 116 with the appropriate commands needed to delete, create, and update these child objects in the data repository 106. For child objects that are created or deleted, populating 416 may include determining if these child objects have any children and populating the command structure 116 with appropriate create and delete commands for these children. Likewise, for child objects requiring an update, these objects may be passed through a comparison routine to process any children that these objects might have. Once generated, the command structure 116 may be executed to bring about the desired changes in a data repository 106.

Figure 5:
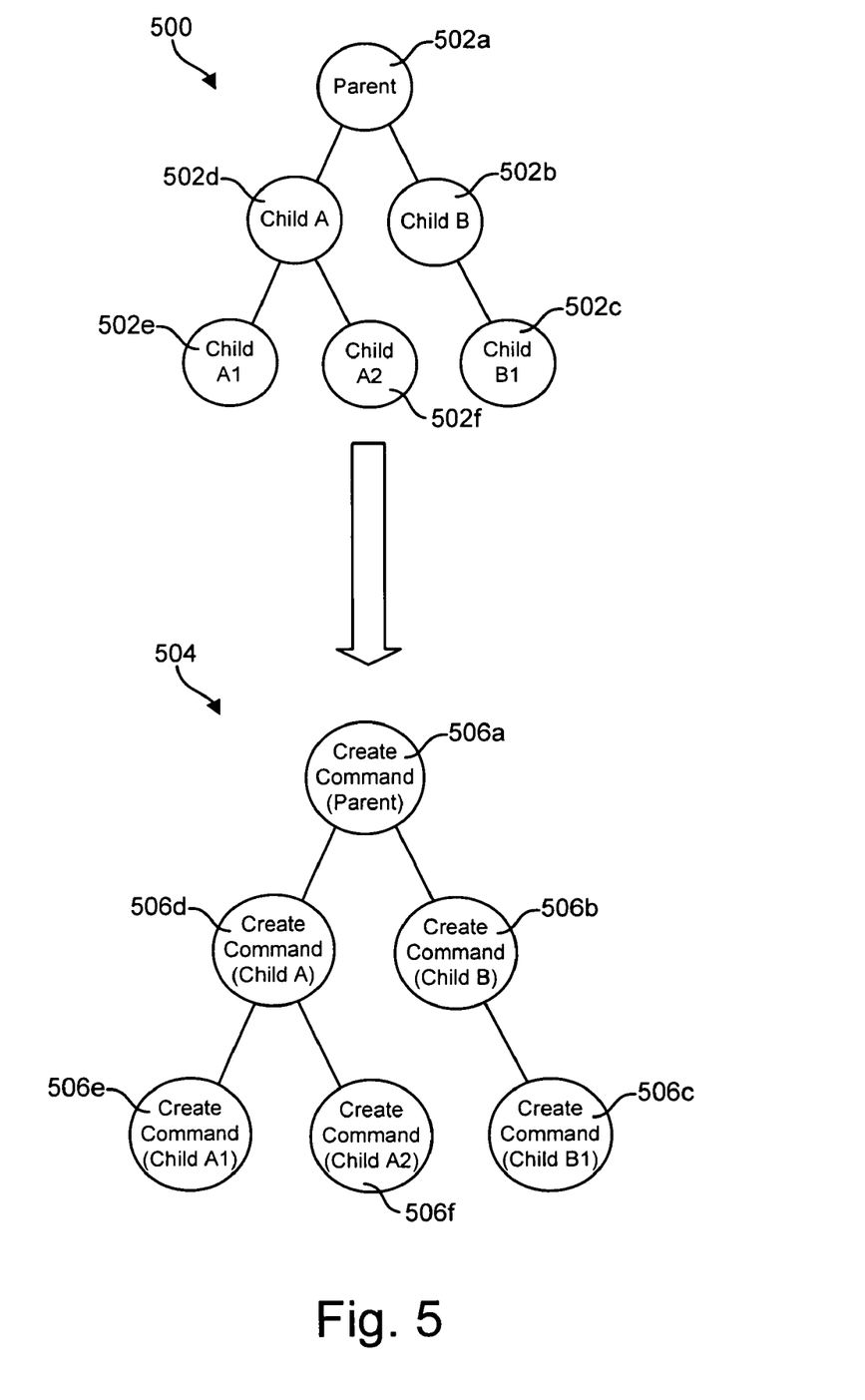
FIG. 5 is a block diagram of one embodiment of a command structure used to create a hierarchical data structure.

Referring to FIG. 5, one example of snapshot processing is illustrated. Here, an incoming data structure 500 comprising multiple objects 502a-f is received by the data mediator 104.

There is no corresponding data structure in the data repository 106. In such a case, the data mediator 104 may create the incoming data structure 500 in the data repository 106. To accomplish this, the data mediator 104 generates a command structure 504 comprising multiple commands 506a-f corresponding to each of the individual objects 502a-f in the incoming data structure 500. This command structure 504 may then be executed by the data mediator 104 to create the incoming data structure 500 in the data repository 106.

Figure 6:
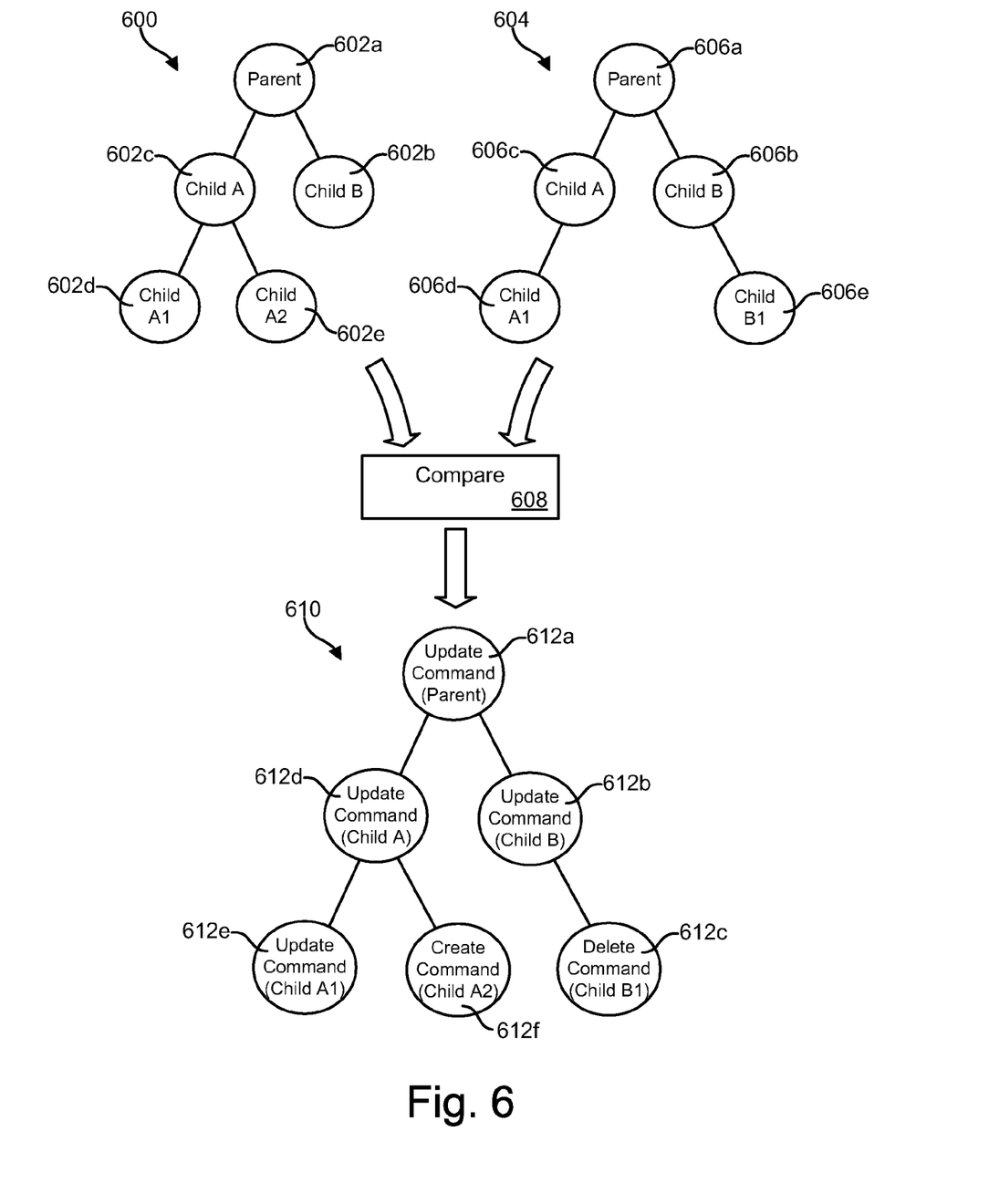
FIG. 6 is a block diagram of one embodiment of a command structure generated by comparing an incoming hierarchical data structure with a hierarchical data structure retrieved from a data repository.

Referring to FIG. 6, another example of snapshot processing is illustrated. Here, the data mediator 104 receives an incoming data structure 600, comprising multiple objects 602a-e, for which a corresponding data structure 604, comprising multiple objects 606a-e, exists in the data repository 106. The incoming data structure 600 includes a new child object 602e that does not exist in the data structure 604. Likewise, the existing data structure 604 includes a child object 606e that does not exist in the incoming data structure 600. The data mediator 104 compares 608 the two structures 600, 604, using a process such as that described in relation to FIG. 4, and generates a command structure 610 comprising multiple commands 612a-f.

As illustrated in this example, the command structure 610 includes an update command 612a for the top-level object 612a, and update commands 612b, 612d, 612e for objects that exist in both the incoming and the existing data structures 600, 604. Similarly, the command structure includes a create command 612f associated with the object 602e that exists in the incoming data structure 600 but not in the existing data structure 604, and a delete command 612c associated with the object 606e that appears in the existing data structure 604 but not the incoming data structure 600.

Figure 7:
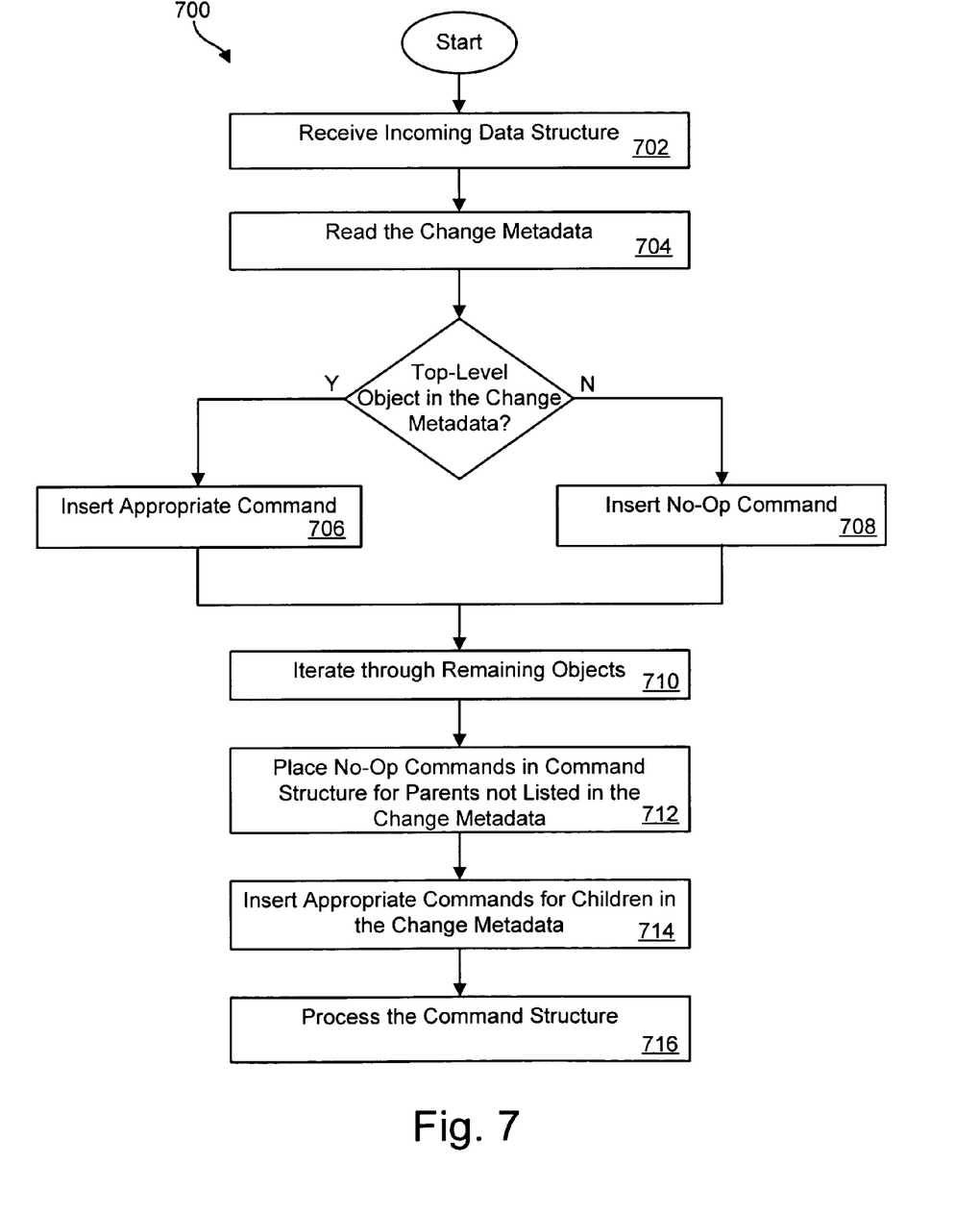
FIG. 7 is a flow chart diagram of one embodiment of a method for processing a delta data structure.

Referring to FIG. 7, in one embodiment, a method 700 for processing a delta data structure may include receiving 702 an incoming data structure 114 and reading 704 change metadata in the incoming structure 114. If the top-level object in the incoming data structure 114 is in the change metadata, then an appropriate command (e.g., update command, create command, etc.) is inserted 706 as the top-level command in the command structure 116. If the top-level object is not in the change metadata, a no-op command is inserted 708 as the top-level command in the command structure 116. As previously discussed, a no-op command does not represent an operation, but rather acts as a place-holder to preserve the relationship between parent and child commands. As will be shown in relation to FIG. 8, the no-op command also enables the construction of a command structure 116 that is roughly isomorphic to the incoming data structure 114. This allows child commands to maintain their relationship with parent commands, thereby providing origination information if necessary.

Once an appropriate command is inserted at the top level of the command structure 116, the method 700 may then iterate 710 through the remaining objects in the change metadata. For parents that are not in the change metadata but who have children that are in the change metadata, no-op commands are placed 712 in the command structure 116 for these parents. Commands may then be inserted 714 in the command structure 116 for children that are in the change metadata. This command structure 116 may then be processed 716 to bring about the desired changes in the data repository 106.

Figure 8:
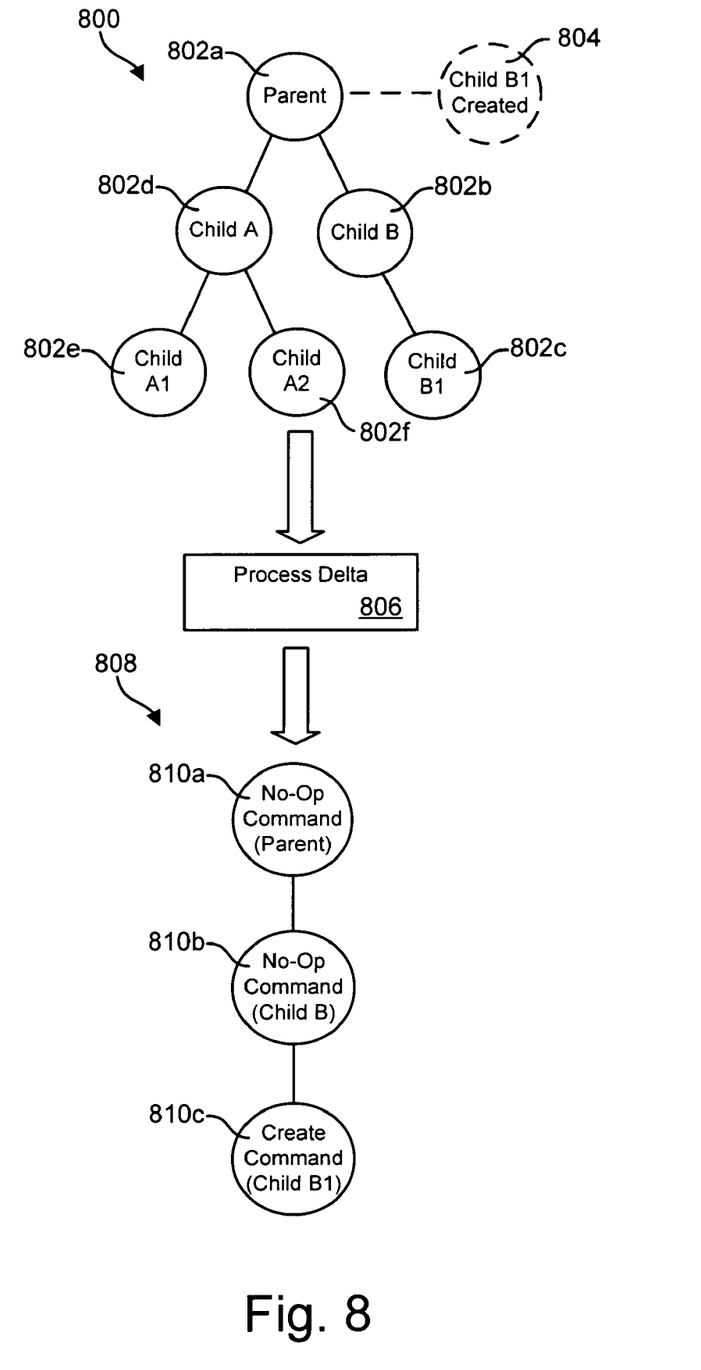
FIG. 8 is a block diagram of one embodiment of a command structure generated for a delta data structure.

Referring to FIG. 8, one example of delta processing is illustrated. Here, an incoming data structure 800 comprising multiple objects 802a-f is received by the data mediator 104. The incoming data structure 800 contains change metadata 804 indicating changes that have been made to the structure 800. In this particular example, the metadata 804 indicates that "Child B1" has been created.

This data structure 800 may then be processed 806 using a method such as that discussed in relation to FIG. 7. Because, the top-level object 802a is not modified by the change metadata 804, a no-op command 810a is placed in the command structure 808 corresponding to this object 802a. Similarly, because the object 802b is not in the change metadata 804 but has a child object 802c that is in the change metadata 804, a no-op command 810b is placed in the data structure 808 for this object 802b. Finally, because the metadata 804 indicates that "Child B1" has been created, a create command 810c is placed in the command structure 808 for this object 802c. Once generated, the command structure 808 may be processed by executing each of the commands 810a-c in the data repository 106.

Figure 9:
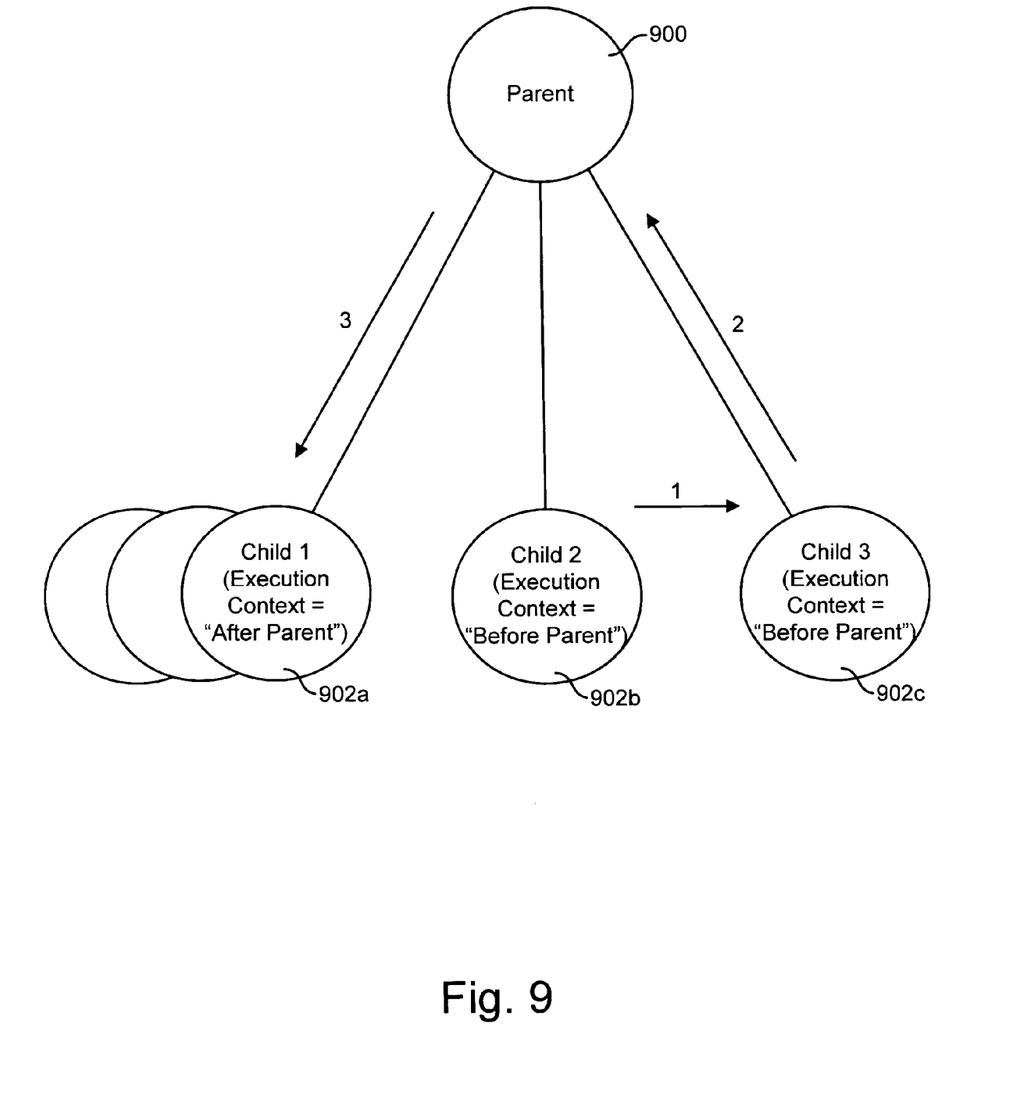
FIG. 9 is a block diagram illustrating the execution sequence of various commands based on their execution context.
Figure 10:
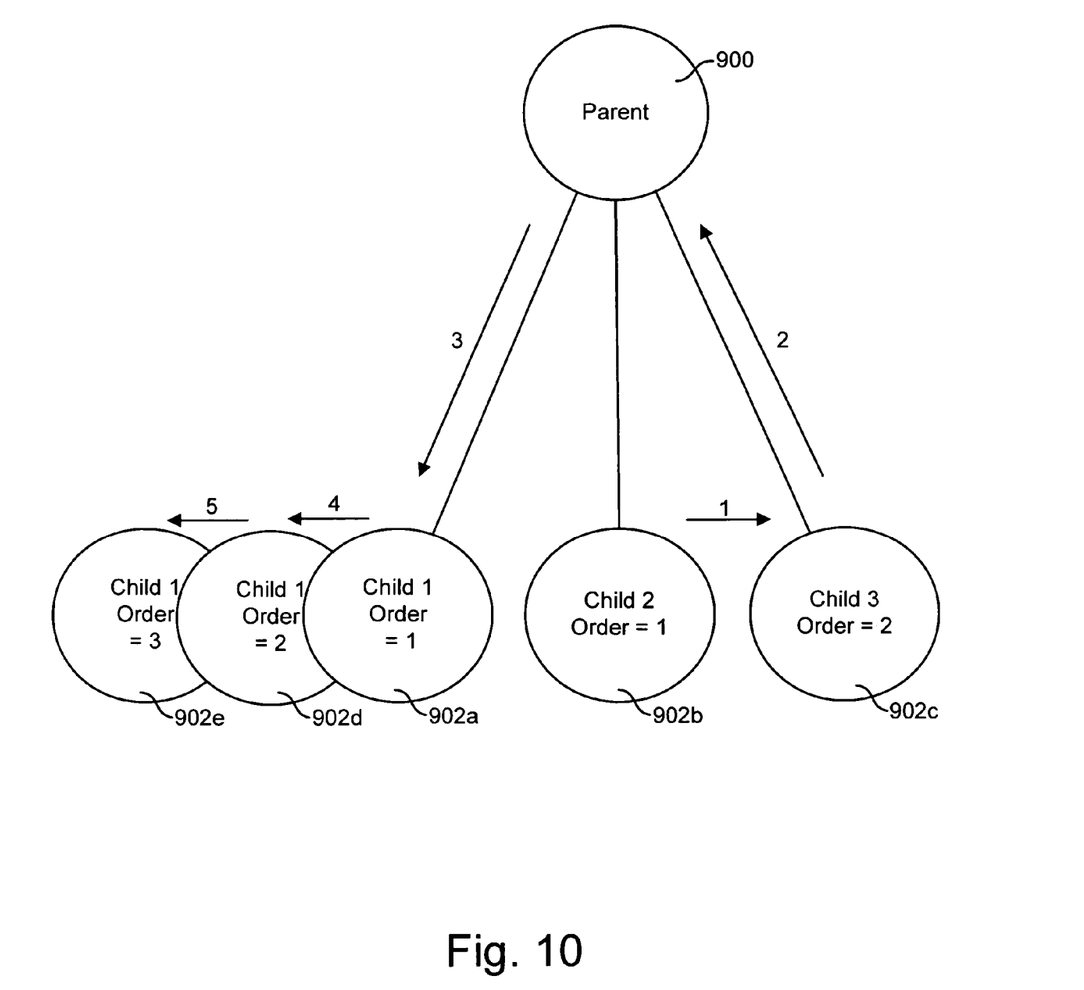
FIG. 10 is a block diagram illustrating the execution sequence of various commands based on an execution order.

Referring to FIGS. 9 and 10, as was previously mentioned in the discussion relating to FIG. 2, an execution sequence may be established to execute commands in a certain order. In certain embodiments, the execution sequence may be established by specifying two values—an execution context and an execution order. The execution context may identify the execution sequence of a command relative to its parent command. The execution order may indicate the execution sequence of commands having the same execution context.

For example, referring specifically to FIG. 9, if a parent command 900 includes a first child command 902a with an execution context having a value of "After Parent," and two child commands 902b, 902c with an execution context having a value of "Before Parent," the child commands 902b, 902c will be processed before the parent command 900. Likewise the child command 902a will be processed after the parent command 900. Because the child commands 902b, 902c have the same execution context, the order of execution of these two commands 902b, 902c relative to one another, may be randomly determined unless an execution order is set for these two commands 902b, 902c as will be discussed in relation to FIG. 10.

Referring specifically to FIG. 10, if the execution order of child command 902b is set before the execution order of child command 902c, then child command 902b will be executed before child command 902c (assuming that all child commands 902a-c have the same execution context as specified in FIG. 9). Similarly, if the child command 902a is one of several child commands 902a, 902d, 902e of multiple cardinality, an execution order may be set for each of these commands 902a, 902d, 902e. These commands 902a, 902d, 902e will be executed after the parent command 900 in the order specified by their execution order.

Figure 11:
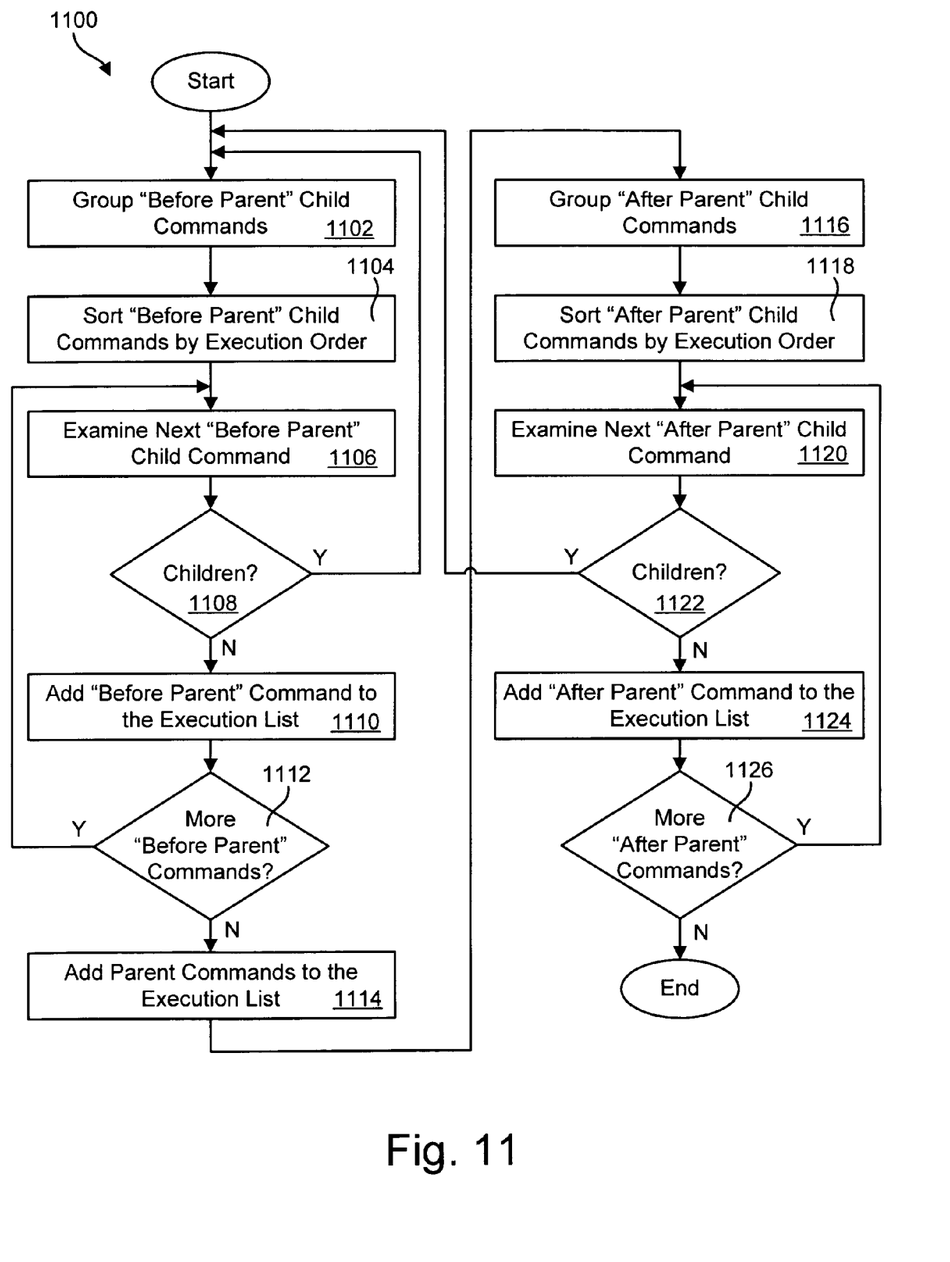
FIG. 11 is a flow chart diagram of one embodiment of a process for executing a command structure in accordance with a pre-established execution sequence.

Referring to FIG. 11, in one embodiment, a method 1100 for processing a command structure 116 according to a pre-established execution sequence includes grouping 1102 child commands (that are children of the top-level command) having an execution context designated as "Before Parent." These child commands are then sorted 1104 according to their execution order.

Once sorted, the first child command in this group is examined 1106 to determine if it has any children (at a decision step 1108). If it has children, the method 1100 is reinitiated at step 1102 for these children. If the child command does not have any children, then it is added 1110 to an execution list. If there are more child commands designated as "Before Parent" (as determined at a decision step 1112), then the next child command is examined 1106 to see if it has any children (at the decision step 1108). This process is repeated until all of the "Before Parent" child commands are examined 1106 for children. Once all of the "Before Parent" child commands are examined, the parent commands are added 1114 to the execution list.

Next, child commands that are designated as "After Parent" are grouped 1116. These commands are then sorted 1118 according to their execution order. Like the "Before Parent" commands, the "After Parent" commands are then examined 1120 one by one to determine if they have any children (at a decision step 1122). If there are children, the method 1100 is reinitiated at step 1102. If the child command does not have any children, then it is added 1124 to the execution list. If there are more child commands designated as "After Parent" (as determined at a decision step 1126), then the next child command is examined 1120 to see if it has any children (at the decision step 1122). This process is repeated until all of the "After Parent" child commands are examined 1106 for children. Once the method 1100 has processed the entire command structure 116, the command structure 116 may be executed according to the sequence established in the execution list.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for processing a hierarchical data structure, the method comprising:
    receiving a hierarchical data structure from a client, wherein the hierarchical data structure represents hierarchical data in a structure independent of a specific type of data repository;
    determining a specific type of data repository for which the hierarchical data structure is to be processed;
    determining what actions are needed to correctly process the hierarchical data structure with respect to a data repository of the determined type;
    dynamically generating a hierarchical command structure comprising a series of repository-specific commands to interface with the specific type of data repository and satisfy processing requirements of the hierarchical data structure, the hierarchical command structure comprising a parent node and at least one child node, each node of the command structure comprising an independent repository-specific command for processing a particular node in the hierarchical data structure independent of the other nodes of the command structure;
    specifying an execution sequence for the nodes of the command structure, the execution sequence defined by one of an execution order and execution context, an execution context defining an execution sequence for a child node relative to its parent node, an execution order defining an execution sequence for nodes with the same execution context; and
    executing the repository-specific commands to process the hierarchical data structure with respect to the data repository.

2. The method of claim 1, wherein the repository-specific commands are selected from the group consisting of an update command, a create command, a delete command, a retrieve command, a no-op command, and a function call command.

3. The method of claim 1, wherein the data repository is selected from the group consisting of a database, an enterprise information system, an XML data source, a web service, an application, and a file system.

4. The method of claim 1, further comprising comparing the hierarchical data structure to be processed with an existing corresponding structure stored in the data repository and generating a hierarchical command structure that when executed causes the structure stored in the data repository to match the hierarchical data structure to be processed.

5. The method of claim 4, further comprising storing the execution sequence in the hierarchical command structure.

6. The method of claim 4, further comprising executing the repository-specific commands in accordance with the execution sequence.

7. The method of claim 1, further comprising determining whether the incoming hierarchical data structure is one of a snapshot structure, a delta structure, and a function call.

8. The method of claim 7, further comprising, in the event the hierarchical data structure is a snapshot structure, comparing the hierarchical data structure with an existing hierarchical data structure retrieved from the data repository.

9. The method of claim 7, further comprising, examining change metadata from at least one of an annotation and a header associated with the delta structure, in response to the hierarchical data structure comprising a delta structure.

* * * * *